United States Patent
Gillham et al.

(10) Patent No.: US 12,253,988 B1
(45) Date of Patent: Mar. 18, 2025

(54) TEXT ANALYSIS AND VERIFICATION METHODS AND SYSTEMS

(71) Applicant: Originality.ai Inc, Collingwood (CA)

(72) Inventors: Jonathan Gillham, Collingwood (CA); Conor Watt, Collingwood (CA); Liam Mcnally, Collingwood (CA)

(73) Assignee: Originality.ai Inc., Collingwood (CA)

( * ) Notice: Subject to any disclaimer, the term of this patent is extended or adjusted under 35 U.S.C. 154(b) by 0 days.

(21) Appl. No.: 18/600,421

(22) Filed: Mar. 8, 2024

Related U.S. Application Data

(60) Provisional application No. 63/544,624, filed on Oct. 17, 2023.

(51) Int. Cl.
| | | |
|---|---|---|
| *G06F 16/95* | (2019.01) | |
| *G06F 16/215* | (2019.01) | |
| *G06F 16/2457* | (2019.01) | |
| *G06F 16/953* | (2019.01) | |
| *G06F 40/211* | (2020.01) | |
| *G06F 40/232* | (2020.01) | |
| *G06F 40/253* | (2020.01) | |
| *G06F 40/289* | (2020.01) | |

(52) U.S. Cl.
CPC ...... *G06F 16/215* (2019.01); *G06F 16/24578* (2019.01); *G06F 16/953* (2019.01); *G06F 40/211* (2020.01); *G06F 40/232* (2020.01); *G06F 40/253* (2020.01); *G06F 40/289* (2020.01)

(58) Field of Classification Search
None
See application file for complete search history.

(56) References Cited

U.S. PATENT DOCUMENTS

| | | | | |
|---|---|---|---|---|
| 8,275,803 | B2 * | 9/2012 | Brown | G06F 16/334 |
| | | | | 705/14.44 |
| 8,738,617 | B2 * | 5/2014 | Brown | F16H 37/02 |
| | | | | 706/14 |

(Continued)

FOREIGN PATENT DOCUMENTS

CN 113536775 10/2021

OTHER PUBLICATIONS

Y. Ma et al., "AI vs. Human-Differentiation Analysis of Scientific Content Generation", Worcester Polytechnic Institute, USA, pp. 1-18, Jan. 1, 2023.

(Continued)

*Primary Examiner* — Eliyah S. Harper
(74) *Attorney, Agent, or Firm* — Bauer and Joseph

(57) ABSTRACT

The disclosed method and system focus on the analysis and validation of text. The analysis discerns if the text originates from artificial intelligence (AI) mechanisms. The text is then segmented, with each segment undergoing a comparative analysis against indexed content in search engine databases to derive a plagiarism score. The factual statements within the text are isolated and matched with pre-existing data in factual text repositories and the search engine database to ascertain factual accuracy. Furthermore, the system evaluates the readability of the text, while linguistic evaluations, encompassing both grammar and spelling, provide a linguistic correctness score, ensuring the credibility of the text.

10 Claims, 3 Drawing Sheets

(56) References Cited

U.S. PATENT DOCUMENTS

| | | | | |
|---|---|---|---|---|
| 8,898,159 | B2* | 11/2014 | Brown | G06F 16/3329 |
| | | | | 706/14 |
| 9,317,586 | B2* | 4/2016 | Chu-Carroll | G06F 16/24578 |
| 9,495,481 | B2* | 11/2016 | Brown | G16H 50/70 |
| 10,325,024 | B2* | 6/2019 | Allen | G06F 40/35 |
| 10,325,025 | B2* | 6/2019 | Allen | G06F 40/56 |
| 11,145,217 | B2* | 10/2021 | Chen | G09B 5/06 |
| 11,695,975 | B1* | 7/2023 | Giraud | G06V 40/40 |
| | | | | 725/25 |
| 12,190,906 | B1* | 1/2025 | Venkataraman | G10L 15/26 |
| 2011/0313757 | A1* | 12/2011 | Hoover | G06F 40/205 |
| | | | | 704/9 |
| 2018/0137099 | A1* | 5/2018 | Allen | G06F 40/30 |
| 2018/0150752 | A1* | 5/2018 | Henderson | G06N 20/00 |
| 2019/0065610 | A1* | 2/2019 | Singh | G06F 16/9535 |
| 2019/0122258 | A1* | 4/2019 | Bramberger | G06N 3/08 |
| 2020/0159824 | A1* | 5/2020 | Boxwell | G06F 16/3344 |
| 2021/0042290 | A1* | 2/2021 | Banipal | G06F 16/2365 |
| 2021/0065042 | A1* | 3/2021 | Gopalan | G06N 3/045 |
| 2022/0101326 | A1* | 3/2022 | Kim | G06Q 20/4016 |
| 2022/0328063 | A1* | 10/2022 | Mariotti | G06N 20/00 |
| 2024/0054909 | A1* | 2/2024 | Rushkin | G06F 40/232 |
| 2024/0070434 | A1* | 2/2024 | Garg | G06N 3/0455 |
| 2024/0257173 | A1* | 8/2024 | Rajaram | G06N 5/022 |
| 2024/0265420 | A1* | 8/2024 | Glazier | H04L 67/535 |

OTHER PUBLICATIONS

L. Mindner et al., "Classification of Human- and AI-Generated Texts: Investigating Features for ChatGPT", IU International University of Applied Sciences, Germany, pp. 1-19, Aug. 10, 2023.

H. Alamleh et al., "Distinguishing Human-Written and ChatGPT-Generated Text Using Machine Learning", https://www.researchgate.net/publication/371200951 Apr. 2023.

* cited by examiner

TEXT ANALYSIS AND VERIFICATION METHODS AND SYSTEMS

CROSS REFERENCE TO RELATED APPLICATION

This application claims the benefit under 35 U.S.C. § 119(e) of U.S. Provisional Application No. 63/544,624 entitled "TEXT ANALYSIS AND VERIFICATION METHODS AND SYSTEMS" filed Oct. 17, 2023, which is incorporated herein by reference.

TECHNICAL FIELD

The present disclosure pertains to the field of digital content analysis and verification, focusing on assessing text for originality, factual accuracy, readability, linguistic correctness, and determining whether the content is generated by a human or an artificial intelligence mechanism.

BACKGROUND

In the digital age, as the boundaries of information dissemination have expanded, there has been a veritable explosion in the volume of textual content created and distributed. Such unprecedented growth is a result of the democratization of content creation tools, the ubiquity of internet access, and the insatiable global appetite for fresh content. Such an aspect naturally presents both opportunities and challenges, chief among them being the assurance of the accuracy, originality, and comprehensibility of texts.

Historically, the task of verifying the originality of a document or written work was a laborious process, typically requiring manual reviews by individuals well-acquainted with existing literature. The individuals would rely on their knowledge and sometimes rudimentary tools to identify instances of duplication or plagiarism. Naturally, the method was time-consuming and also fraught with possible oversight. As technology progressed, various digital tools emerged to check for duplications, but many of the early systems were limited in their scope and effectiveness, often failing to detect more sophisticated instances of content appropriation or reuse.

Moreover, the rise of artificial intelligence (AI) in recent times has introduced a new layer of complexity. Advanced AI models in the domain of natural language processing, have become adept at producing human-like textual content. Such advancements make the process even more challenging to ascertain whether a given piece of text is the original work of a human author or the output of an algorithmic model.

Beyond the concerns of originality and authenticity, factual accuracy remains a paramount concern. The digital age, with rapid dissemination capabilities, has also seen the unfortunate spread of misinformation. Traditional methods of fact-checking often involved experts manually cross-referencing statements against known sources or databases. However, given the vast and growing expanse of information available, such methods quickly become untenable, leading to inefficiencies and inaccuracies. Comprehensibility, measured by readability scores, is another vital facet of content verification. While a text might be original and factually accurate, the value diminishes if the intended audience finds the texts challenging to understand. Previous tools assessing readability worked in isolation, neglecting the interconnected nature of originality, factual accuracy, and linguistic correctness.

Linguistic correctness forms a foundational pillar for any written content. A text fraught with grammatical errors and spelling mistakes can significantly dent the credibility, even if the text excels in other metrics like originality and accuracy. However, linguistic checking tools of the past have often functioned in silos, detached from systems that check for originality or factual veracity of content.

Given such intricate web of challenges, there is a pressing need for an integrated system that checks for linguistic correctness and also dives deep into the nuances of originality, AI-origin determinations, factual accuracy, and readability. Such an integrated solution would mark a significant advancement in content verification, instilling greater trust in written works and ensuring that the vast digital information landscape remains credible and reliable.

SUMMARY

The aim of the present disclosure is to provide a method and system for analyzing and verifying a text to assess text for originality, factual accuracy, readability, linguistic correctness. The aim of the disclosure is achieved by a method and system for analyzing and verifying a text for determining whether the content is generated by a human or an artificial intelligence mechanism.

In an embodiment, the present disclosure discloses a method for analyzing and verifying a text, comprising: analyzing a text to determine whether the text is generated by an artificial intelligence mechanism; generating the multiple segments of the text, and comparing each segment with content of one or more indexed text of a search engine database to identify a plagiarism score; extracting the factual statements from said text, and comparing each extracting factual statements with the pre-stored information of one or more factual text databases and the search engine database to determine a factual accuracy score; calculating a readability score of the text; and performing a grammatical check and a spelling check to determine a linguistic correctness score.

In yet another embodiment, generating the multiple segments of the text includes dividing the text into segments based on semantic or syntactic boundaries.

In another embodiment, the analysis of the text comprises stylistic and structural characteristic evaluation to determine whether the text is generated by an artificial intelligence mechanism.

In another embodiment, the plagiarism score is calculated using a similarity scoring algorithm to determine the level of resemblance between segments with content of one or more indexed text of a search engine database.

In another embodiment, the feedback or suggestion is provided for improvement based on the determined plagiarism score, the factual accuracy score, the readability score and linguistic correctness score to a user through a user interface.

In another embodiment, the factual accuracy score is calculated using a natural language processing algorithm to identify and extract factual assertions.

In another embodiment, the text is body text of a URL.

In another embodiment, the SEO optimization compares the SEO metrics of the text with SEO metrics of content from up to 10 competing URLs identified by conducting search on the search engine database to evaluate the relative SEO performance of the text.

In another embodiment, the SEO optimization step improvises the visibility and ranking of the text on search engine results pages by identifying areas of improvement based on the SEO performance.

In another embodiment, the full site scan step provides a comprehensive analysis of AI generation detection, plagiarism, factual accuracy, readability, and linguistic correctness across the entire website, aiding in maintaining a consistent quality and authenticity of content throughout the website.

In an embodiment, the present disclosure discloses a system for analyzing and verifying a text, comprising: a computing device receives a text; a serve arrangement configured to: receive the text from the computing device; analyze the received text to determine whether the text is generated by an artificial intelligence mechanism; generate the multiple segments of the text, and comparing each segment with content of one or more indexed text of a search engine database to identify a plagiarism score; extract the factual statements from said text, and comparing each extracting factual statements with the pre-stored information of one or more factual text databases and the search engine database to determine a factual accuracy score; calculate a readability score of the text; and perform a grammatical check and a spelling check to determine a linguistic correctness score.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein.

Embodiments of the present disclosure will now be described, by way of example only, with reference to the following diagrams.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
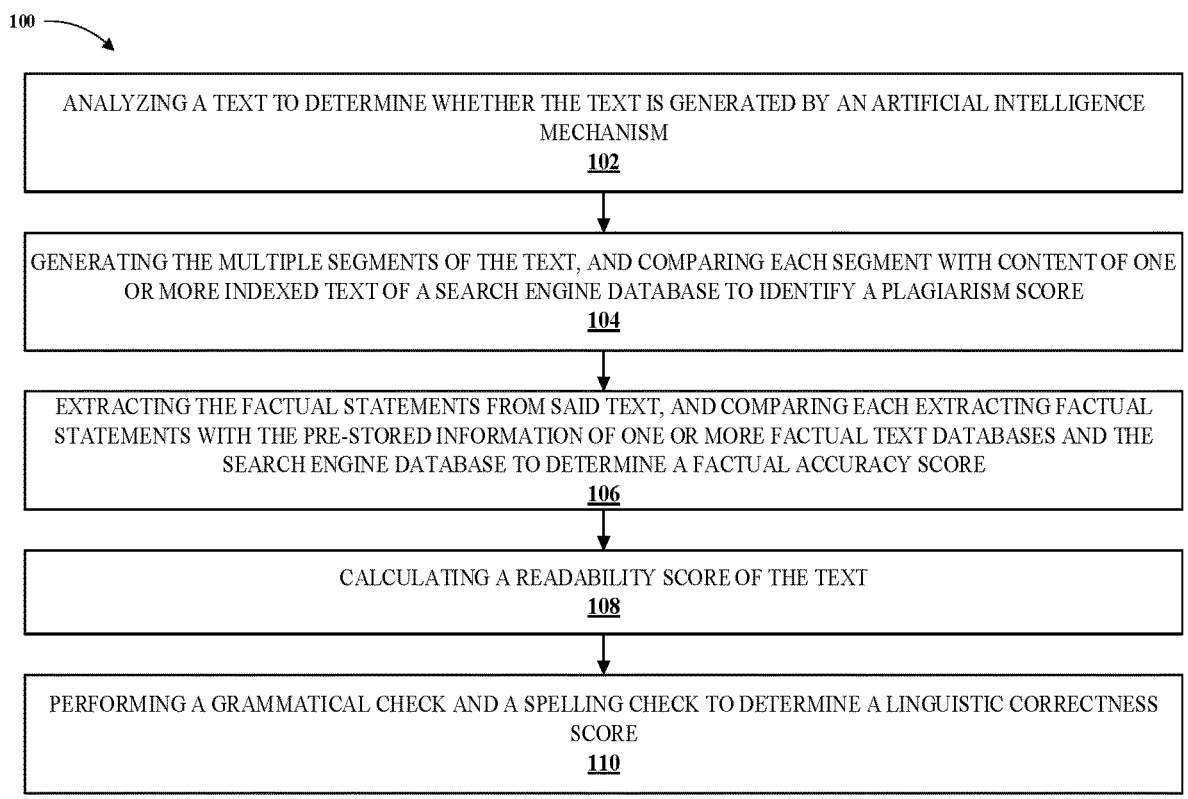
FIG. 1 illustrates a method for analyzing and verifying a text, in accordance with embodiments of the present disclosure.

FIG. 1 illustrates method 100 for analyzing and verifying a text, in accordance with embodiments of the present disclosure. Step 102 involves, analyzing the text to ascertain whether the text has been generated by an artificial intelligence (AI) mechanism. Such analysis differentiates between human-generated and AI-generated text based on specific linguistic patterns, syntactic structures, or other distinctive features commonly associated with AI-generated text. At step 104, the text is segmented into multiple sections, wherein each section is compared against the content stored in one or more indexed text databases of a search engine. Similarities are identified between the segments and any existing content in the database and subsequently generates a plagiarism score, which quantifies the degree of similarity between the provided text and existing materials. At step 106, factual statements are extracted from the text, wherein the factual statements are compared with information stored in pre-existing factual text databases and the search engine database. The dual comparison verifies the accuracy of the factual declarations made within the provided text. The result is a factual accuracy score, which indicates the reliability of the factual information presented. At step 108, the readability of the text is evaluated, by assessing the readability of text, considering multiple factors, including but not limited to, sentence structure, vocabulary complexity, and coherence. A readability score is calculated to provide insight about how easily the text can be understood by the intended audience. At step 110, grammatical and spelling check is performed. This helps in identifying and quantifying any linguistic errors as linguistic correctness score, indicating the level of grammatical and spelling accuracy within the provided text.

In an embodiment, the approach of method 100 is to segment the text based on either semantic or syntactic boundaries to ensure the highest granularity in analysis. Semantic boundaries indicate the meaning and context behind words and phrases. By segmenting based on the boundaries, method 100 ensures that text encapsulates a coherent idea, making comparisons more contextually accurate. Conversely, syntactic boundaries hinge on grammatical structures of the language. When segmenting based on the syntactic boundaries, each unit adheres to linguistic rules, ensuring each segment is grammatically self-contained. The interplay of the two types of boundaries allows method 100 to dissect the text in a manner that retains both the contextual essence and grammatical integrity. As a result, when the aforesaid segments undergo further analysis, method 100 can more effectively identify discrepancies, overlaps, or inconsistencies, resulting in a thorough examination.

In an embodiment, to identify whether the text has been generated by the AI mechanism, the stylistic and structural variation of the text are analyzed. While AI mechanism has made significant strides in mimicking human language patterns, there exist subtle distinctions between AI-produced and human-authored text. The evaluation process of method 100 scans the text for the aforesaid distinctions, which could range from repetitive patterns typical of AI output to a lack of emotional undertones often present in human writings. Thereby, method 100 can make an informed decision regarding the origin of text. Distinguishing between AI and human-generated text is crucial in various fields, especially in areas where genuine human perspective and experience are irreplaceable.

In an embodiment, calculating the plagiarism score can be evaluated based on a similarity scoring algorithm that compares each segmented portion of the text against content found within indexed texts in search engine databases. Such comparison ensures a high degree of accuracy, identifying even the minutest instances of text overlap. Unlike rudimentary plagiarism checks, the similarity scoring algorithm ensures that genuine coincidences are not flagged inappropriately. Conversely, instances of content appropriation that might bypass conventional checks are effectively flagged. The segment-wise approach offers detailed insights, allowing content creators to understand exactly where overlaps might occur and make necessary modifications.

In an embodiment, the provision of feedback or suggestions to users is critical in method 100. Based on scores and evaluations across various parameters like plagiarism, factual accuracy, readability, and linguistic correctness, method 100 provides detailed insights via an interactive user interface. The feedback serves as a roadmap for content creators, guiding them on areas requiring enhancement, modification, or verification. Whether a suggestion is provided to rephrase and improve readability, a fact-check alert, or a linguistic error, the feedback loop ensures that text reaches the optimal quality before dissemination.

In an embodiment, the calculation of factual accuracy score can be performed using advanced natural language processing (NLP) algorithms, which are adept at navigating the linguistic prospect of the text, identifying statements that purport to present factual information. Once the assertions are flagged, the linguistic prospect undergo verification process, cross-referenced against the databases or trusted factual sources. By automating the process, method 100 performs text verification and also enhances the reliability of the text, ensuring that method 100 stands for factual precision in the digital text.

In an embodiment, the body text of a URL is analyzed. Exemplary text can be a blog post, an academic article, a news story, or any other form of web content.

In an embodiment, a SEO optimization compares the SEO metrics of the text with SEO metrics of content from up to 10 competing URLs identified by conducting search on the search engine database to evaluate the relative SEO performance of the text. Since online visibility is intertwined with content consumption.

In an embodiment, further refining the SEO optimization step, the method 100 may evaluate and also enhance visibility of the text on search engine output. By highlighting weak spots in SEO metrics and providing actionable insights, method 100 facilitates content improvements to elevate the search engine ranking. Ensuring that quality content gets the deserved visibility is a critical factor in the digital content prospect.

In an embodiment, the 'full site scan' step may represent content quality. The aforesaid step ensures that the text of the website meets quality standards. Every piece of information undergoes checks for AI generation detection, plagiarism, factual accuracy, readability, and linguistic correctness. The process ensures authenticity, consistency, and quality of website.

In an embodiment, method 100 enables identification of flaws and rectification thereof to ensure that the digital textual aspect remains a space of trustworthiness, engagement, and relevance. Whether the text is an online article, a research paper, or a blog post, the method ensures that the text possesses integrity and quality.

Figure 2:
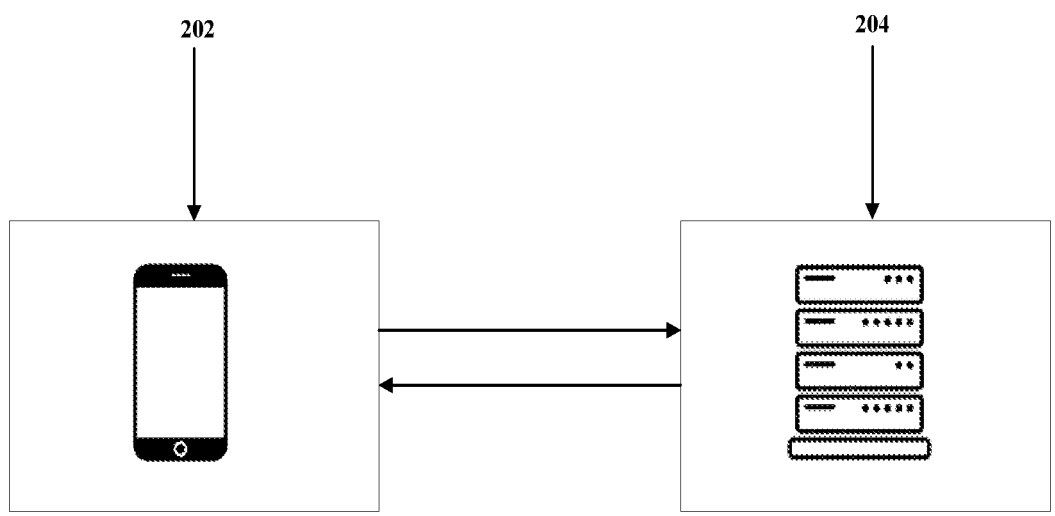
FIG. 2 illustrates a system to scrutinize and validate text, discerning the authenticity, factual accuracy, linguistic correctness, readability, and origin of the content, in accordance with embodiments of the present disclosure.

FIG. 2 illustrates a system 200 to scrutinize and validate text, and discern the authenticity, factual accuracy, linguistic correctness, readability, and origin of the text, in accordance with embodiments of the present disclosure. System 200 addresses various aspects of text analysis, ensuring that the text meets quality and reliability parameters. System 200 comprises a computing device 202, a server arrangement 204 and other known components of a text analyzer application.

In an embodiment, the computing device 202 receives text from a user. The user can be a content creator, a researcher, or an editor uploading a document, an article, or any piece of written text, for thorough examination. System 200 can have profound implications in academic settings where the authenticity and accuracy of information are paramount, or in journalism where credibility is an important aspect.

In an embodiment, upon receiving the text from computing device 202, the server arrangement 204 performs several analysis. The server arrangement 204 examines whether the text is crafted by the AI mechanism. Since AI-driven text generation tools are gaining prominence, distinguishing between human and AI-generated text has become imperative. For instance, in the journalistic field, discerning the human touch in writing can be critical in maintaining the emotional nuance and depth that AI might lack.

In an embodiment, the server arrangement 204 segments text into multiple parts, wherein each part is compared with the content of indexed texts from a search engine database to determine a plagiarism score. Each segment undergoes a comparison process, allowing for the identification of any overlapping text or similarities with existing indexed texts. Plagiarism score can be crucial in academic and professional environments where the uniqueness of text is highly valued. For instance, an academic researcher can utilize system 200 to ensure the originality of their work before submission, thereby maintaining the integrity of their contribution to the scholarly community.

In an embodiment, server arrangement 204 extracts factual statements from the segmented text, followed by comparing each statement with pre-stored information from factual text databases and the search engine database to assess factual accuracy. The comparison becomes more significant where disseminating accurate information is critical, such as in news articles or educational text. For a journalist working against tight deadlines, the aforesaid feature could act as a final line of defense, ensuring that the disseminated information is accurate and reliable.

In another embodiment, the server arrangement 204 also calculates a readability score. By assessing the complexity, sentence structure, and word choice, server arrangement 204 determines how easily the text can be understood by the intended audience. In fields like health communication, where conveying complex information in an understandable manner is essential, the aforementioned feature can be a significant asset, ensuring the text is accessible to a broader audience.

In an embodiment, server arrangement 204 performs grammatical and spelling checks to determine a linguistic correctness score. For the user grammatical and spell-checking feature ensures that the text adheres to the linguistic norms and is free of errors. In text creation, the quality of language can significantly be impactful for audience engagement, therefore the grammatical and spelling check enables linguistic precision.

In an embodiment, server arrangement 204 ensures the textual integrity and also aids in refining the text. The server arrangement 204 assists users in navigating the aspect of text creation, where the balance between authenticity, accuracy, readability, and linguistic correctness is essential. For instance, in the digital marketing sector, where text is a key driver of user engagement, the system 200 can ensure that the disseminated text is unique and accurate and also linguistically refined and readable, optimizing user interaction and engagement.

In an embodiment, the application of the system 200 can be used for any domain and user type. Whether the user is a student looking to validate their assignment, a blogger ensuring the authenticity of their post, or a corporate professional verifying the accuracy and readability of a report, the system 200 offers an array of solutions tailored to diverse needs. In the domain of online publishing, where the competition is intense and the margin for error is minimal, utilizing the system 200 can be the difference between creating impactful text and noise.

In another embodiment, the detailed analysis provided by system 200 is a diagnostic tool and also a remedial one. System 200 identifies lapses in text and provides actionable feedback, enabling the user to rectify the identified issues effectively. The aforesaid action can be instrumental for text creators who are constantly striving to improve their work, offering them insights and suggestions that can elevate the quality of their text.

In a practical scenario, a content creator might be working on an article intended for online publication. The importance of the article being unique, factually accurate, readable, and linguistically correct is paramount. Here, the system can act as an effective tool, analyzing the article for plagiarism, verifying the factual statements made within the article, assessing the readability, and performing a thorough grammatical and spelling check. The system ensures that the content creator can present a refined, credible, and high-quality piece to their audience. The capability of the system to analyze and verify text has broader implications in maintaining the integrity of information disseminated across various platforms. Whether the text is an academic paper, a news report, a blog post, or any form of written text, system 200 acts as a scrutinizer, maintaining the sanctity of information.

Figure 3:
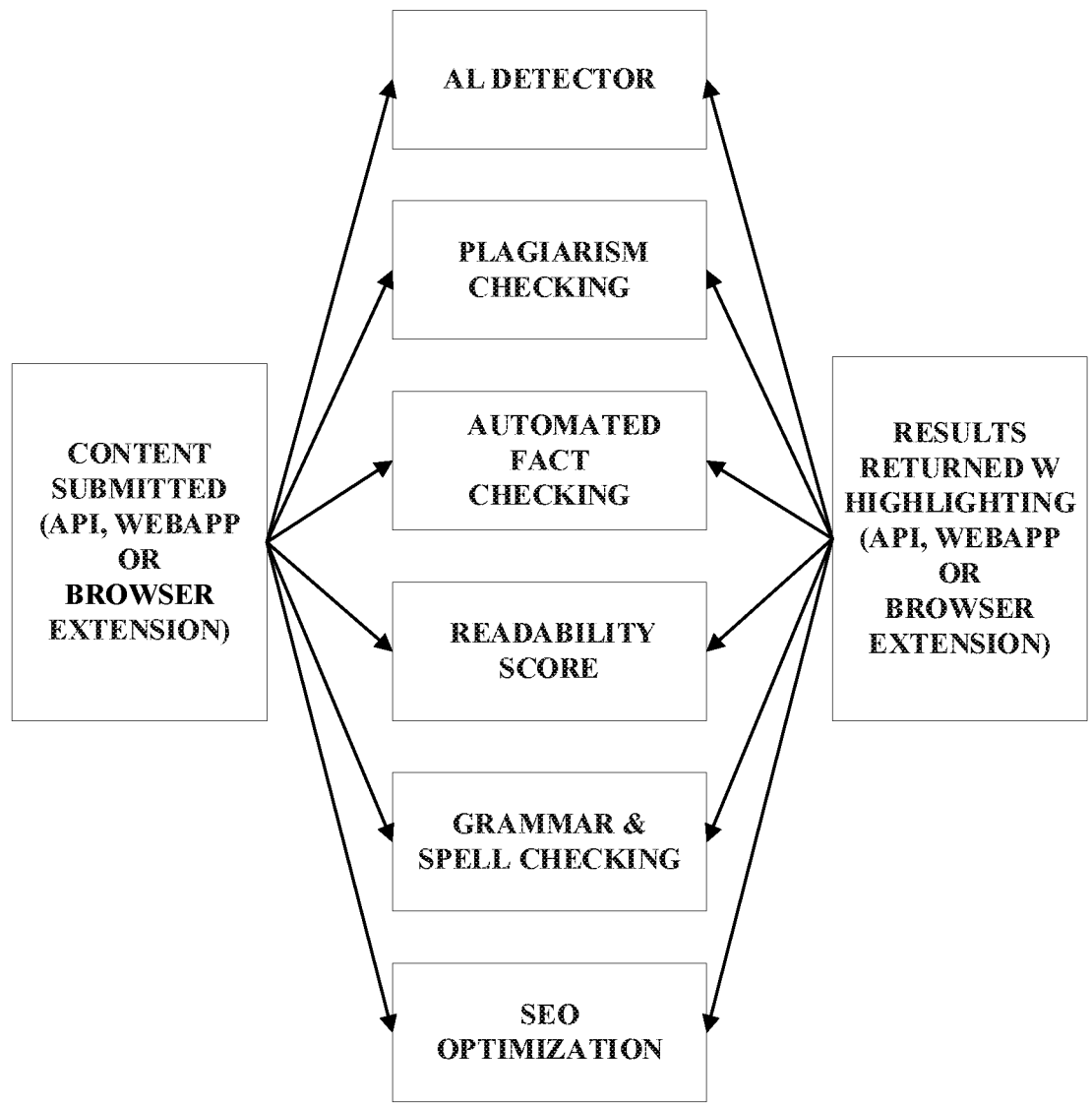
FIG. 3 illustrates a process flow diagram for analyzing and verifying a text, in accordance with embodiments of the present disclosure.

FIG. 3 illustrates a process flow diagram for analyzing and verifying a text, in accordance with embodiments of the present disclosure. Textual contents are first introduced into system 200 through the computing device 202, facilitated via diverse interfaces such as an API, WebApp, or a browser extension. Once ingested, the server arrangement 204 seamlessly retrieves the text for a sequential series of analytical operations. Initially, server arrangement 204 identifies if the text has been generated by the AI mechanism. The server arrangement 204 further identifies plagiarism and an automated fact-checking process. A readability score is generated to assess the comprehensibility of the text, followed by thorough grammar and spelling checks ensuring linguistic accuracy. Additionally, system 200 also evaluates the text for SEO metrics. After executing the aforementioned multi-layered operations, server arrangement 204 then consolidates the outcomes and returns the results, providing a holistic overview of the authenticity, accuracy, and overall quality of the text.

Throughout the present disclosure, the term 'Artificial intelligence (AI)' as used herein relates to any mechanism or computationally intelligent system that combines knowledge, techniques, and methodologies for controlling a bot or other element within a computing environment. Furthermore, the artificial intelligence (AI) is configured to apply knowledge and that can adapt it-self and learn to do better in changing environments. Additionally, employing any computationally intelligent technique, the artificial intelligence (AI) is operable to adapt to unknown or changing environment for better performance. The artificial intelligence (AI) includes fuzzy logic engines, decision-making engines, preset targeting accuracy levels, and/or programmatically intelligent software.

Artificial intelligence (AI) in the context of the present disclosure relates to software-based algorithms that are executable upon computing hardware and are operable to adapt and adjust their operating parameters in an adaptive manner depending upon information that is presented to the software-based algorithms when executed upon the computing hardware. Optionally, the artificial intelligence (AI) include neural networks such as recurrent neural networks, recursive neural networks, feed-forward neural networks, convolutional neural networks, deep belief networks, and convolutional deep belief networks; self-organizing maps; deep Boltzmann machines; and stacked de-noising auto-encoders. An "artificial neural network" or simply a "neural network" as used herein can include a highly interconnected network of processing elements, each optionally associated with a local memory. In an example, the neural network may be Kohonen map, multi-layer perceptron and so forth. The processing elements can be referred to herein as "artificial neural units," "artificial neurons," "neural units," "neurons," "nodes," and the like, while connections between the processing elements. A neuron can receive data from an input or one or more other neurons, process the data, and send processed data to an output or yet one or more other neurons. The neural network or one or more neurons thereof can be generated in either hardware, software, or a combination of hardware and software, and the neural network can be subsequently trained.

Optionally, artificial intelligence (AI) employ any one or combination of the following computational techniques: constraint program, fuzzy logic, classification, conventional artificial intelligence, symbolic manipulation, fuzzy set theory, evolutionary computation, cybernetics, data mining, approximate reasoning, derivative-free optimization, decision trees, or soft computing.

Operations in accordance with a variety of aspects of the disclosure described above would not have to be performed in the precise order described. Rather, various steps can be handled in reverse order or simultaneously or not at all.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for analyzing and verifying a text, comprising:
    analyzing a text to determine whether the text is generated by an artificial intelligence mechanism;
    generating the multiple segments of the text, and comparing each segment with content of one or more indexed text of a search engine database to identify a plagiarism score;

extracting the factual statements from said text, and comparing each extracting factual statements with the pre-stored information of one or more factual text databases and the search engine database to determine a factual accuracy score;

calculating a readability score of the text;

performing a grammatical check and a spelling check to determine a linguistic correctness score; and comparing, through SEO optimization, SEO metrics of the text with SEO metrics of content from up to 10 competing URLs identified by conducting a search on the search engine database to evaluate the relative SEO performance of the text.

2. The method of claim 1, wherein the step of generating the multiple segments of the text includes dividing the text into segments based on semantic or syntactic boundaries.

3. The method of claim 1, wherein the analysis step comprises stylistic and structural characteristic evaluation to determine whether the text is generated by an artificial intelligence mechanism.

4. The method of claim 1, wherein the plagiarism score is calculated using a similarity scoring algorithm to determine the level of resemblance between segments and content of one or more indexed text of the search engine database.

5. The method of claim 1, further comprising providing feedback or suggestions for improvement based on the determined plagiarism score, the factual accuracy score, the readability score and linguistic correctness score to a user through a user interface.

6. The method of claim 1, wherein the factual accuracy score is calculated using a natural language processing algorithm to identify and extract factual assertions.

7. The method of claim 1, wherein the text is body text of a URL.

8. The method of claim 1, wherein the SEO optimization step improvises the visibility and ranking of the text on search engine results pages by identifying areas of improvement based on the SEO performance.

9. The method of claim 1, wherein the full site scan step analyses AI generation detection, plagiarism, factual accuracy, readability, and linguistic correctness across the entire website, aiding in maintaining a consistent quality and authenticity of text throughout the website.

10. A system for analyzing and verifying a text, comprising:

a computing device receives a text;

a server arrangement configured to:

receive the text from the computing device;

analyze the received text to determine whether the text is generated by an artificial intelligence mechanism;

generate the multiple segments of the text, and comparing each segment with content of one or more indexed text of a search engine database to identify a plagiarism score;

extract the factual statements from said text, and compare each extracting factual statements with the pre-stored information of one or more factual text databases and the search engine database to determine a factual accuracy score;

calculate a readability score of the text;

perform a grammatical check and a spelling check to determine a linguistic correctness score; and compare, through SEO optimization, SEO metrics of the text with SEO metrics of content from up to 10 competing URLs identified by conducting a search on the search engine database to evaluate the relative SEO performance of the text.

\* \* \* \* \*